(12) United States Patent
Rector et al.

(10) Patent No.: US 7,793,615 B2
(45) Date of Patent: Sep. 14, 2010

(54) COVER APPARATUS

(76) Inventors: Robert Rector, 408 N. Laurel St., Ashland, OR (US) 97520; Ronda Smith Rector, 408 Laurel St., Ashland, OR (US) 97520

( * ) Notice: Subject to any disclaimer, the term of this patent is extended or adjusted under 35 U.S.C. 154(b) by 22 days.

(21) Appl. No.: 12/094,120

(22) PCT Filed: Nov. 16, 2006

(86) PCT No.: PCT/US2006/060973

§ 371 (c)(1), (2), (4) Date: May 22, 2008

(87) PCT Pub. No.: WO2007/087084

PCT Pub. Date: Aug. 2, 2007

(65) Prior Publication Data

US 2008/0251032 A1 Oct. 16, 2008

(51) Int. Cl.
*A01K 1/015* (2006.01)
(52) U.S. Cl. ................................................... 119/28.5
(58) Field of Classification Search ................ 119/28.5; 5/420; 428/40.1, 41.7, 42.2
See application file for complete search history.

(56) References Cited

U.S. PATENT DOCUMENTS 6,458,442 B1 * 10/2002 McKay ...................... 428/40.1
2008/0083377 A1 * 4/2008 Hurwitz ...................... 119/168

* cited by examiner

*Primary Examiner*—Yvonne R. Abbott
(74) *Attorney, Agent, or Firm*—Michael L. Greenberg, Esq.; Greenberg & Lieberman, LLC

(57) ABSTRACT

A cover that attracts pet hair and other debris, while covering a table, chair, pet bed, or other item. The cover prevents moisture from penetrating completely through it, as it has a second surface to ensure that whatever it covers remains dry. Conventional means of attachment ensures that the present invention, which is biodegradable, can be held securely during use but can be easily attached and removed when desired.

11 Claims, 1 Drawing Sheet

COVER APPARATUS

FIELD OF THE INVENTION

The present invention concerns a cover apparatus for household areas and pet areas. More specifically, the present invention concerns a cover apparatus that does not just protect areas of the home and areas around a pet, but attracts and retains pet hair and other debris from a pet.

BACKGROUND OF THE INVENTION

There are many reasons why people have pets. Pets provide companionship; pets keep rodents out of the home; pets deter burglars; and pets provide something warm and fuzzy to hold while watching television. Unfortunately, having a pet in the home means that the home is susceptible to pet hair and other debris that would normally not occur or exist if a pet were absent from the home. For example, if a pet owner has two black loveseats sitting in their living room and the pet owner also has a white, long-haired cat, the black loveseats in the living room will not stay black for long. Unfortunately, the white pet hair will gather on the black loveseats and the black loveseats will appear uninviting and dirty to visitors.

Thus, there is a need for a device that preserves the look of furniture in a pet owner's home, so that pet hair can be easily removed from the furniture. A pet owner can take a vacuum to the black loveseats in the aforementioned example, and try to vacuum the cat hair off. However, pet hair tends to be rather fine and removing it from furniture can be an arduous task, even with a vacuum. There is a similar need for pet owners to have some device that prevents pet hair from accumulating on comforters, blankets and other surfaces of the home; for example, even a kitchen table.

If a pet sits on a chair or the kitchen table, pet hair will be left, along with other debris, that might be on the animal's feet, paws or even crumbs from the animal's mouth that might have lingered since the last bite.

There is a need for a device that will protect all these surfaces, so that if a visitor pops in, the pet owner can quickly clean the surfaces or ensure that the pet hair and other debris has been removed. Most pet owners know that pets like to have their own place to sleep, but unfortunately, a cat bed or a dog bed becomes a breeding ground for fleas, cat hair, dog hair and other debris from the animal. There is a need to provide an easy way to clean up or provide a sanitary bed for the animal each night or once a week that will be much simpler than having to vacuum the entire surface of the bed, or will be much simpler than having to remove the cover of the pet bed and wash it in a washing machine.

SUMMARY OF THE INVENTION

The present invention is a disposable cover that attracts materials shed by pets to ensure that pet beds and kitchen tables, furniture, blankets, et cetera, remain clean of pet debris. The present invention can also provide a moisture barrier, so that if a dog slobbers, or a cat or dog drips pieces of food from its mouth, the present invention will protect the surface underneath it.

DETAILED DESCRIPTION OF THE PREFERRED EMBODIMENT

Figure 1:
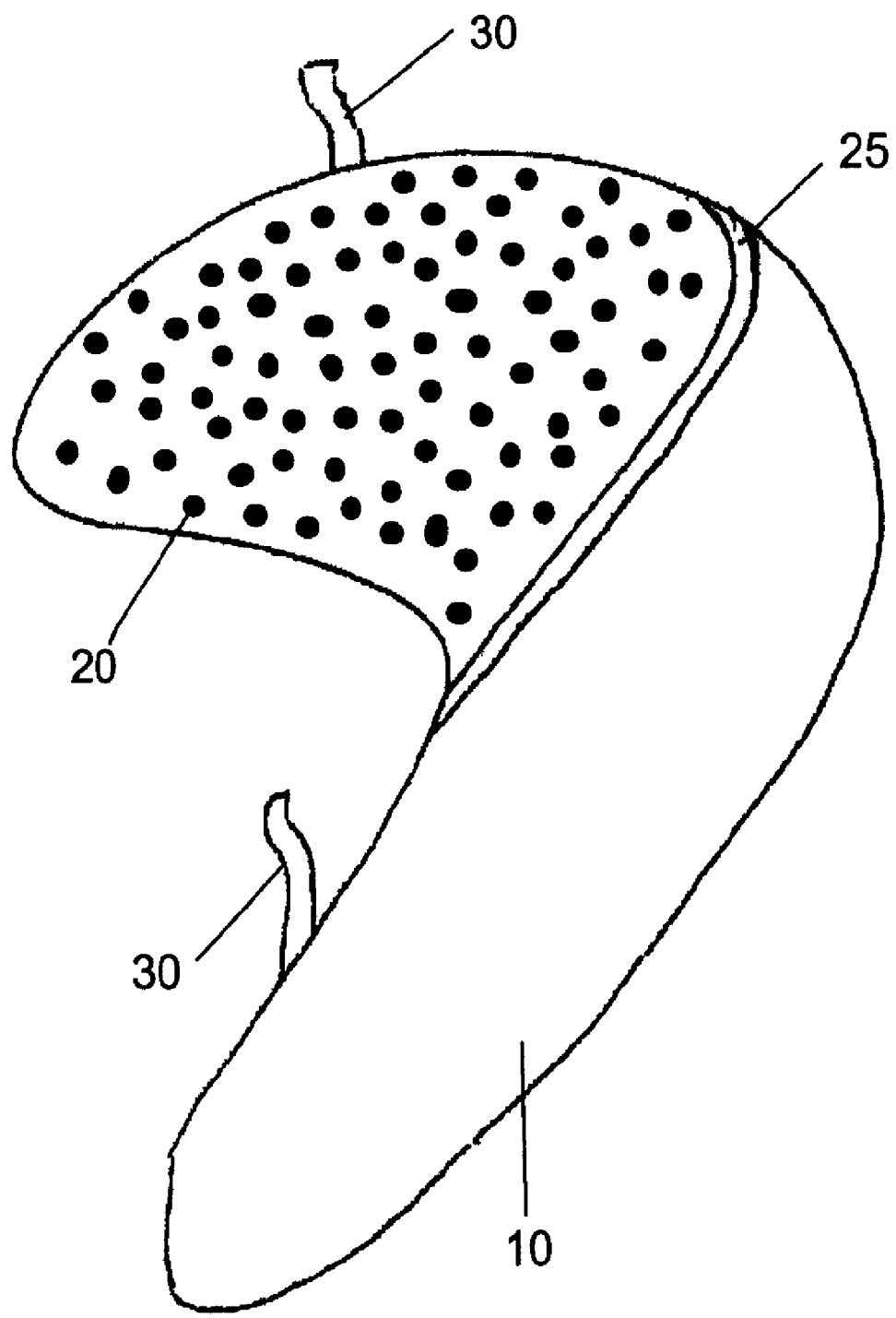
FIG. 1 shows an environmental perspective view of the present invention.

As shown in FIG. 1, the point of impact has a first surface (10), a second surface (20) and attachment means (30). A first surface (10) has a static or ionized charge such that pet hair and other debris will be attracted and will remain in contact with first surface (10) if a pet should rub against first surface (10) or get up and push off from first surface (10). Thus, a cat lying down on first surface (10) would drop cat hair and other debris, which would remain on first surface (10) because of first surface (10)'s ionic static properties. The ionic and static properties of first surface (10) would be as conventionally known, such that first surface (10) could be made of any conventionally known material that has static cling or an ionized attraction.

Second surface (20) is attached to the back side of first surface (10) via any conventional means. Second surface (20) needs to be a moisture barrier of any conventional substance because it is not enough to prevent pet hair and other debris from penetrating the present invention, but moreover, the present invention must prevent moisture from reaching a chair or other surface protected by the present invention. For example, when a pet lies in a pet bed and sleeps for an hour or more, the moisture and heat that is created from the pet needs to be prevented from reaching the actual pet bed that is being covered by the present invention. Should sweat and other moisture reach the pet bed covered by the present invention, undesirable smells would result in the pet bed becoming dirty and requiring cleaning—and the present invention prevents such from occurring.

Moreover, second surface (20), being a moisture barrier, would be important when a dog is taken to a lake or to the beach. The dog typically will climb into the back of a car or a truck, and the moisture that will drip off of the dog needs to be contained. The present invention would contain the drippings from the dog because the present invention would be laid out in the back of the car or laid out in the back of the truck, so that as the dog climbs in, any water or sweat or a combination thereof, would not drip into the car and cause a musty, stale odor in the car long after the dog has departed, but the present invention would prevent the moisture and sweat from reaching any of the surfaces underneath the dog.

An intermediate layer (25) is preferably provide in the present invention. Intermediate layer (25) is made of any conventionally absorbent material, so that when moisture from the pet comes into contact with the present invention, intermediate layer (25) will try to absorb the moisture, so that if a lot of moisture is dripping from the pet, such as dripping from a dog that has just been in the water at the lake, rather than just prevent the water from coming into contact with the car, the present invention will actually absorb it as well. Thus, in operation, should a dog get into the back of a car that has been equipped with the present invention, the dog would stand or lie on first surface (10), which would not only attract loose dog hair and other debris that might be on the dog, but water dripping from the dog would pass through first surface (10), be absorbed by intermediate surface (25) and then be prevented from seeping through the present invention by second surface (20). Because the present invention is intended to be fully disposable, it would not matter that pet hair and other debris, as well as moisture, sweat, and any other liquid material is retained in the present invention.

The present invention is also preferably biodegradable, such that all materials used in the present invention are inexpensive, so that they are disposable, but are biodegradable. The present invention can be secured to any surface. Preferably, the present invention has attachment means (30), which are conventional hook and loop type fasteners of various shapes and sizes. So, for example, the present invention via attachment means (30), could be secured to a loveseat in the living room, or it could be secured to a blanket on top of a bed. Similarly though, the present invention could use any conventional means of attachment so that it can be secured and prevented from moving when a pet gets up or runs across it. For example, conventional drawstring ties, elastic bands or adhesive surfaces could be provided as part of the present invention, much like attachment means (30), so that the present invention remains in one spot when the pet is on top of it. The attachment means would need to be temporary though, because while the present invention needs to remain intact and in position during use, a person would want to be able to simply and quickly remove the present invention, so that the protected surface underneath the present invention could be quickly shown or viewed or used, if necessary.

The present invention is made in a variety of colors, as well as a relatively transparent or translucent color. It is contemplated that while some users of the present invention would want to show the true color of a blanket or furniture or other item being protected under the present invention, other users of the present invention might want to change the color of the actual surface being protected. For example, one user might want to preserve the color and the look of the tablecloth on the kitchen table, and knowing that a cat tends to sit on top of a kitchen table, or lie on top of the kitchen table, the user would use the present invention made of materials that are relatively transparent and/or translucent, so that you can actually see through the present invention and appreciate the color or pattern of the tablecloth.

On the other hand, other users of the present invention might desire to completely cover a pet bed that is being protected underneath the present invention. In such case, the user might want to provide a green pet bed or a red pet bed or a blue pet bed, depending on the time of day, the season or a holiday. Thus, for example, the present invention could be used to make a bed look appropriate for the $4^{th}$ of July, where the pet bed could be colored red or white or blue, and even more particularly, first surface (10) of the present invention would have a pattern, such as stars and stripes.

It should be understood that the first surface (10) could have conventional adhesive properties that augment and/or replace the static or ionized charge aforementioned.

We claim:

1. A method for using a disposable cover, comprising:
   attracting pet debris via ionic static properties of a first surface;
   preventing moisture and heat of a pet from reaching actual surface via a second surface;
   absorbing moisture via an intermediate layer;
   securing the intermediate layer between the first surface and the second surface; and
   securing the first surface, the second surface and the intermediate layer to any surface.

2. The method for using a disposable cover of claim 1, further comprising attracting pet debris such that pet debris remains on the first surface.

3. The method for using a disposable cover of claim 2, further comprising attracting pet debris such that pet debris remains on the first surface due to the ionic static properties of the first surface.

4. The method for using a disposable cover of claim 1, further comprising attracting pet debris such that pet debris remains on the first surface due to the ionic static properties of the first surface.

5. The method for using a disposable cover of claim 1, further comprising attaching the second surface to a backside of the first surface.

6. The method for using a disposable cover of claim 1, further comprising containing moisture within the second surface.

7. The method for using a disposable cover of claim 6, further comprising preventing moisture from seeping through the second surface.

8. The method for using a disposable cover of claim 1, further comprising preventing moisture from seeping through the second surface.

9. The method for using a disposable cover of claim 1, further comprising providing the intermediate layer to absorb moisture after moisture passes through the first surface, with moisture then prevented from seeping through the intermediate layer via the second surface.

10. The method for using a disposable cover of claim 1, further comprising securing the first surface, the second surface and the intermediate layer to any surface such that the first surface, the second surface and the intermediate layer remain in one spot.

11. A method for using a disposable cover, comprising:
    attracting pet debris via ionic static properties of a first surface;
    preventing moisture and heat of a pet from reaching actual surface via a second surface;
    absorbing moisture via an intermediate layer;
    securing the intermediate layer between the first surface and the second surface;
    securing the first surface, the second surface and the intermediate layer to any surface;
    further comprising attracting pet debris such that pet debris remains on the first surface;
    further comprising attracting pet debris such that pet debris remains on the first surface due to the ionic static properties of the first surface;
    further comprising attaching the second surface to a backside of the first surface;
    further comprising containing moisture within the second surface;
    further comprising preventing moisture from seeping through the second surface;
    further comprising providing the intermediate layer to absorb moisture after moisture passes through the first surface, with moisture then prevented from seeping through the intermediate layer via the second surface; and
    further comprising securing the first surface, the second surface and the intermediate layer to any surface such that the first surface, the second surface and the intermediate layer remain in one spot.

* * * * *